United States Patent Office 3,429,255
Patented Feb. 25, 1969

3,429,255
COFFEE PERCOLATOR
Alfonza Pedalino, Commack, N.Y., assignor to Peter L. Cardiello, Brooklyn, N.Y.
Filed Jan. 4, 1967, Ser. No. 607,267
U.S. Cl. 99—305
Int. Cl. A47j *31/04, 31/44*
6 Claims

ABSTRACT OF THE DISCLOSURE

A self-timing coffee percolator with a heat retaining element and a by-pass arrangement for water passing up the percolating stem. When the element absorbs heat, the circulating water is by-passed away from the coffee solids. When the heat source is removed, circulating water is passed through the coffee solids. The heat retaining element retains sufficient heat to percolate coffee for a given period of time. The heat retaining element is insulated from the pot everywhere except directly under the pump of the percolator. A watertight connection connects the element to the pot. The various components of the pot have a degree of "play," and a force exerted by a two-position by-pass control interacts with that "play" to provide self-alignment and by-pass sealing.

Background of the invention

The present invention relates to a self-timing beverage brewing device suitable for preparing coffee, tea, etc., of the type commonly known as a percolator coffee pot. The invention is an improvement of the invention disclosed in my prior patent, U.S. Patent No. 3,068,777.

U.S. Patent No. 3,068,777 discloses a somewhat conventional coffee percolator, but additionally having a heat-retaining element and a by-pass arrangement. The heat retaining element at the bottom of the pot absorbs heat from a heat source, eventually causing water to be pumped up the percoating stem in the usual manner. As long as the heat retaining element is absorbing heat, the water going up the stem is by-passed away from the dry coffee solids in the basket and back down toward the bottom of the pot. The by-pass channel is defined by the outer surface of the percolator stem and the inner surface of the basket tube, and the operation of the by-pass is controlled by a knob on the top of the pot. When the heat source is removed from the heat retaining element, the knob is then operated so that the water coming up the percolating stem flows to the coffee solids and not down the by-pass. The heat retaining element holds enough heat when removed from the heat source to cause the coffee to percolate for the well-known optimum time for coffee brewing of six to eight minutes.

The present invention is embodied in a coffee percolator of the same general form as described above, but is directed to improvements in the arrangement of the heat retaining element at the bottom of the pot, the arrangement of the by-pass control at the top of the pot, and the interrelationship of the various components of the percolator.

Summary of the invention

In the present invention, a somewhat conventional coffee percolator is provided, having a so-called pump, percolating stem, and perforated basket for holding coffee solids. A heat retaining element is positioned at the bottom of the pot, as in my prior patent, to provide the optimum percolation of six to eight minutes after the heat retaining element is removed from the heat source.

The heat retaining element in the present invention is effectively insulated by air from conducting substantial heat to the coffee pot except at the central portion of the pot directly under the so-called pump. The water in the coffee pot will therefore only boil directly under the pump, while coffee is being made, and the pot will not boil or foam over necessitating cleaning up or resulting in hazardous conditions. The heat retaining element may for example be absorbing heat from the burner of a gas stove, with the burner being turned off before the by-pass control is operated to allow the water coming up the percolating stem to flow through the coffee solids. If the pot were to thereafter boil or foam over, the pilot light of the gas stove could be extinguished to result in dangerous gas leakage. The boiling or foaming over could also cause burns to a bystander.

The air insulation of the heat retaining element from the pot, in conjunction with a limited watertight connection of the element to the pot, also prevents the unavoidable water-induced scaling of the surface of the element from changing the heat conduction characteristics between the element and the pot. These conduction characteristics must remain constant if the heat retaining element is to always cause the coffee to percolate for its optimum time.

The small area of connection of the element to the pot further results in the element retaining a degree of heat to maintain the percolated coffee warm for a long period of time after the percolating action has ceased. The need for rewarming of cold coffee, with the consequent reduction in flavor, is therefore lessened.

The by-pass of the present invention is easily operated by a unique two position control, which in one position exerts a sealing force helping to insure that water coming up the percolating stem is completely by-passed from the coffee solids. This is the closed position of the bypass control, which is the intended position when the heat retaining element is absorbing heat from a heat source.

Means are further provided for a degree of "play" in both the basket holding the coffee solids and the by-pass control. This play of these two elements cooperates with the sealing force of the control means to insure that circulating water completely by-passes the coffee solids when the control means is in its closed position. Because of this cooperation, there is no necessity to manufacture the individual components of the pot to precise dimensions in order to achieve the complete by-pass. A consequent reduction in manufacturing cost results.

Other advantages and the full nature of the invention will be readily understood and appreciated from the following detailed description, taken in conjunction with the accompanying drawings.

Description of the preferred embodiment

Figure 1:
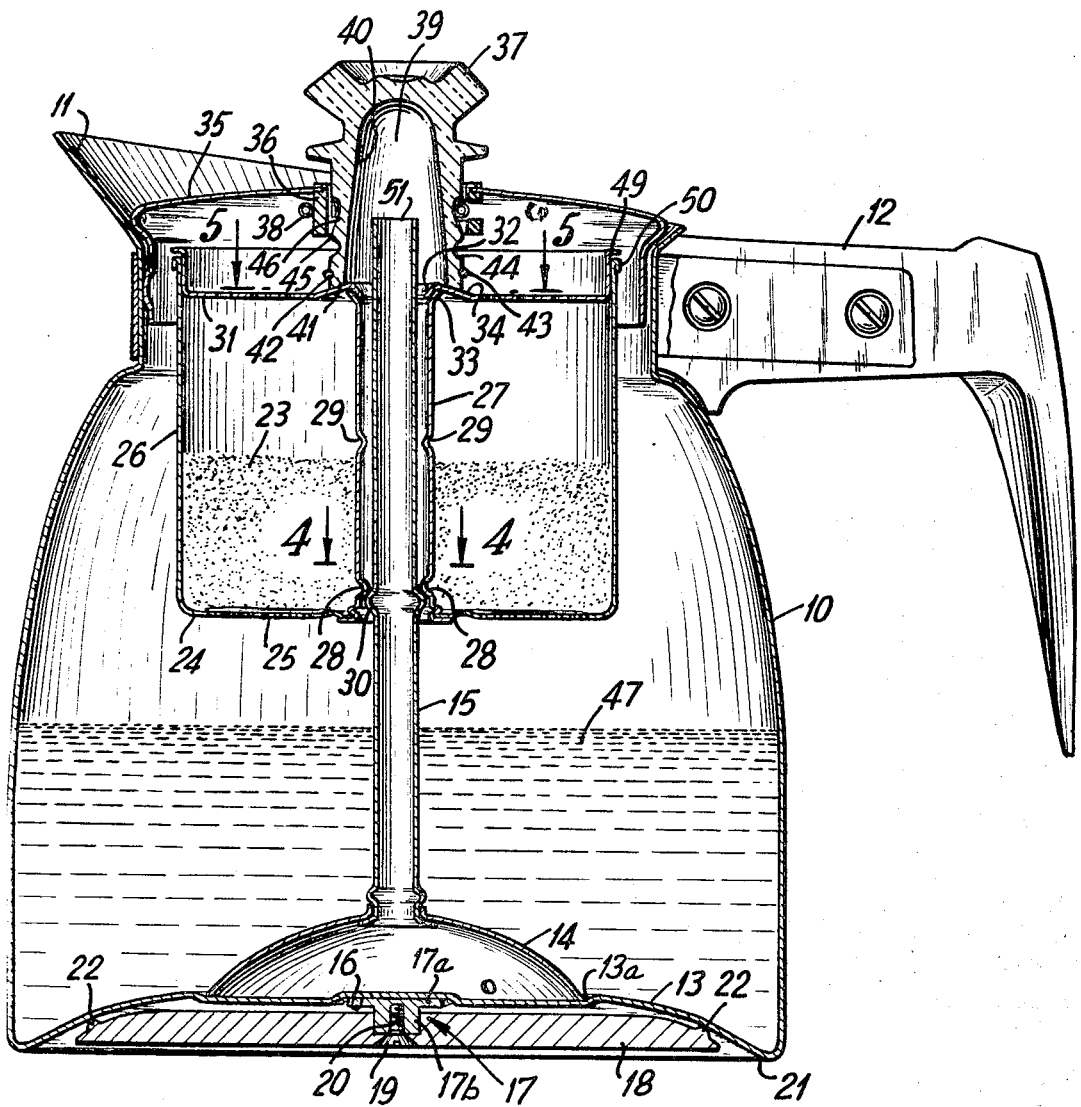
FIGURE 1 is a central vertical section of a brewer embodying the present invention with the by-pass control shown in its downward or closed position.

Referring to FIG. 1, reference numeral 10 designates a conventional cylindrical coffee pot having a pouring lip 11 and a handle 12. It will be understood that the pot and all of its attendant parts which come in contact with the liquid brew are formed of a suitable material which will not adversely affect the flavor of the brew, such materials being aluminum, stainless steel or the like. Supported on the inner surface of the bottom wall 13 of the pot 10, within a well 13a is the so-called pump 14 which is of the conventional design. Well 13a surrounds and serves to align and maintain pump 14 at its proper position at the center of the bottom wall 13. Pump 14 in turn supports a hollow percolating stem 15.

At the center of the bottom wall 13, within the perimeter of pump 14 and directly under the normal position of stem 15, is a raised portion 16 of well 13a. From the outer surface of the bottom wall 13 of the pot, raised portion 16 constitutes an upward recess. A flanged stud 17 is placed in said recess and is attached to bottom wall 13 to form a watertight, thermal connection therewith. A stud 17 having a flange 17a of approximately ¾ inch diameter by ¹⁄₁₆ inch thick and a body 17b of approximately ⅜ inch diameter by ¼ inch long, said flange being welded brazed or soldered to the bottom wall 13, has been found suitable for the present invention.

Supported by the stud 17 and spaced from the bottom wall 13 of the pot is a heat retaining circular disc element 18. The heat retaining disc 18 is attached to bottom wall 13 by screw 19, which fits into a drilled and tapped hole 20 in stud 17 and which is countersunk into heating element 18. Stud 17 is also tightly force-fitted into an opening in disc 18 corresponding in shape to stud body 17b. In this manner good heat conductivity is insured between disc 18 and stud 17, and no water is allowed to enter between disc 18 and stud 17 to cause scaling and change the heat conductivity characteristics between the stud and disc. Physical shocks to the pot also will not be able to easily dislodge the disc 18 from the stud 17.

The heat retaining disc 18 is spaced approximately one-sixteenth of an inch from bottom wall 13 of the pot, and approximately one-eighth of an inch from the horizontal plane of the bottom edge 21 of the pot. Air space insulation is therefore provided around all the surfaces of disc 18. The only portions of disc 18 which are not insulated by air from surrounding surfaces are those portions in contact with stud 17 and a plurality of dimples 22 suitably spaced around the edge of disc 18 which contact and space disc 18 from the bottom wall 13 of the pot. The area of contact of dimples 22 with bottom wall 13 is very small and heat loss through the dimples is negligible.

Heat retaining disc 18 is made of a material chosen for characteristics of high heat retention and relatively low heat conduction. Cast iron is such a material and may be used for heat retaining disc 18 in the present invention. Stud 17 is designed to transfer heat from heat retaining disc 18 to the bottom wall 13 directly under pump 14, thereby forming a substantial heat conductive path between the heat retaining element and the bottom of the container over a limited area beneath the pump. In this manner, heat stored in disc 18 is directed and concentrated under the pump 14 (generally circular) causing percolation in the pump 14 without boiling the liquid in the remainder of pot 10 while coffee is being made. Stud 17 must be capable of making good thermal contact to both the heat retaining disc 18 and the bottom wall 13 of pot 10. Materials such as aluminum or stainless steel may be used for stud 17 in the present invention.

A cast iron heat retaining disc suitable for percolating coffee for the optimum time in a coffee pot of approximately six cup size, might be the order of 4¾ inches in diameter and ¼ inch thick.

The above described arrangement of the disc 18, and stud 17 and wall 13 has a number of advantages. Water will enter the air space between disc 18 and wall 13 when the pot is washed, but the spacing is sufficient that the water will flow back out after the washing. Although the exposed surfaces of disc 18 may scale and oxidize from exposure to air and water, this will have no effect on the designed heat transfer from the disc 18 to the pot 10, since the scaled and oxidized surfaces will not be in contact with the pot. If disc 18 contacted wall 13 all throughout its surface, any water seepage and scaling would change the heat conduction characteristics between said disc and wall. The pot would not then continue to provide percolation for the optimum designed time. The airtight and watertight connection between disc 18 and stud 17, and between bottom wall 13 and stud 17, will of course result in constant heat conduction characteristics.

As an alternate embodiment, the stud 16 is in the form of an integral cast iron central raised portion of cast iron disc 18, said raised portion being directly attached in an airtight and watertight manner to bottom wall 13 of pot 10 by a screw, suitable adhesive, or other suitable means. In other words, heat retaining element 18 is connected to bottom wall 13 directly under pump 14 by a raised integral central portion of said element, and element 18 is insulated by air from surrounding surfaces at all other points with the exception of spacing dimples 22. Said raised portion then forms a substantial heat conductive path between the heat retaining element and the bottom of the container over a limited area beneath the pump.

The disc, stud and pot arrangement as described will serve to maintain percolated coffee warm in the pot up to an hour after percolation. The undesirable rewarming of percolated coffee may thus generally be avoided.

Figure 4:
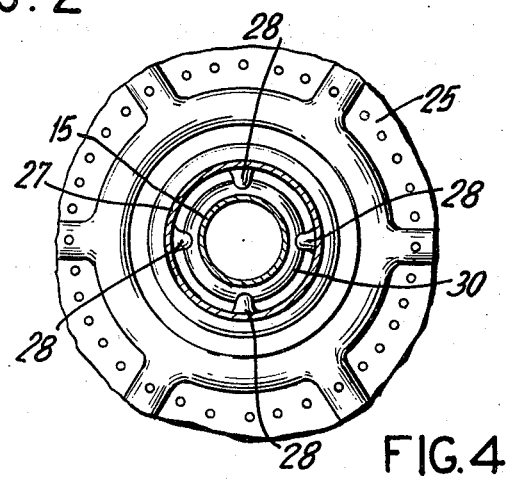
FIGURE 4 is a horizontal section on an enlarged scale taken along lines 4—4 of FIGURE 1.

Referring to FIGURES 1 and 4, the coffee solids 23 to be brewed are placed in a perforated circular basket 24 having a perforated bottom 25, a generally cylindrical side wall 26, and a solid wall center tube 27. Center tube 27 is provided with a plurality of internally extending spacing dimples 28 placed about center tube 27 in a plane adjacent to and parallel to the perforated bottom 25, and similarly an additional group of internally extending spacing dimples 29 are provided about the center tube 27 in a plane parallel to the perforated bottom 25 and preferably located near or above the middle of the center tube 27. The maximum external dimension of stem 15 and the minimum dimensions of the areas described by the spacing dimples 28 and 29 are such that stem 15 fits between the group of spacing dimples 28 and the group of spacing dimples 29 and has a limited degree of clearance within at least the top group of dimples 29. Stem 15 is provided with a customary basket supporting stop 30 which is smaller than the interior dimension of central tube 27 and of sufficient size that the group of lower spacing dimples 28 may rest upon the stop 30 and thus provide support for the basket 24 in an elevated position within the pot 10. The additional upper group of spacing dimples 29 maintain the basket 24 in proper, upright position, with a slight amount of sideward "play" being allowed the basket with respect to stem 15 due to the clearance of said stem with the group of dimples 29.

Figure 5:
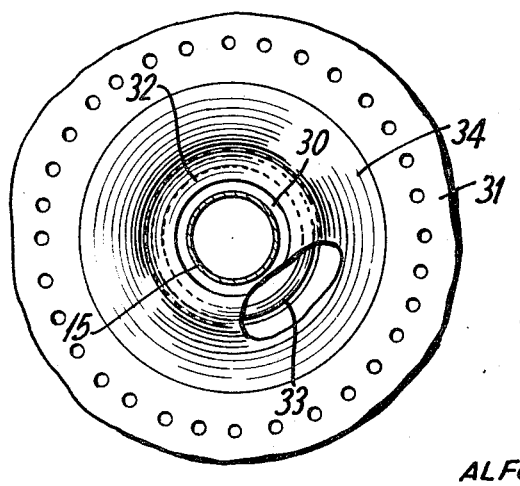
FIGURE 5 is a horizontal section on an enlarged scale taken along lines 5—5 of FIGURE 1, with the by-pass control in its upward position.

Referring now to FIGURES 1 and 5, basket 24 may be closed by a removable perforated lid 31 which fits snugly into the top of basket 24. The lid 31 has a central annular downwardly flared flange 32 provided to extend over the upwardly flared top edge 33 of the central tube 27. Directly adjacent to the flange 32 and also an integral part of the lid 31 is an upwardly flared annular valve seat 34 which is a non-perforated area of said lid 31. The interfitting of flange 32 and the flared top edge 33 prevents any liquid from passing over the top edge 33 of the center tube 27 when the lid 31 is pressed downward thereagainst in the normal procedure of placing the lid 31 on the basket 24. The lid 31 is designed so that flared portions 32 and 34 seat on flared edge 33 before rim 49 of lid 31 contacts basket rim 50. Rims 49 and 50 are therefore slightly spaced from each other when lid 31 is placed on basket 24, and proper sealing between flange 32 and edge 33 is thus insured.

Figure 2:
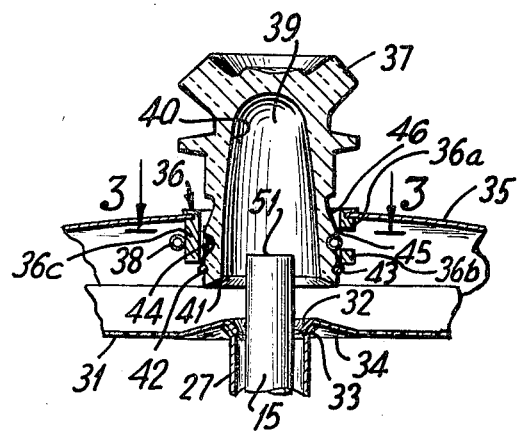
FIGURE 2 is a view of the by-pass control of the present invention as shown in FIGURE 1, but with the by-pass control shown in its upward or open position.
Figure 3:
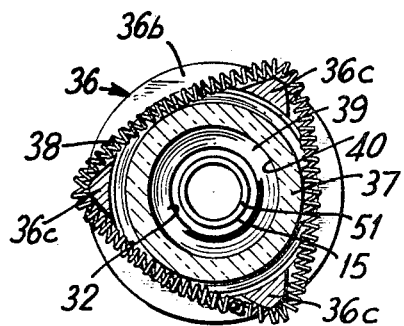
FIGURE 3 is a horizontal section on an enlarged scale of the by-pass control of the present invention taken along lines 3—3 of FIGURE 2.

Referring to FIGURES 1, 2 and 3, the pot 10 is provided with a cover 35 having a collar 36 extending centrally downward within the cover 35. Collar 36 consists of two annular rings 36a and 36b connected to one another by three vertical pieces 36c. Ring 36a of collar 36 is attached to the inner surface of cover 35. A continuous coiled spring 38 is positioned between rings 36a and 36b, the outline of said spring being generally determined by vertical pieces 36c.

Located within the collar 36 is an annular valve knob 37 constituting a by-pass control, which in the preferred embodiment is a transparent sight glass supported from the collar 36 by stressed spring 38. Within the valve knob 37 there is provided an upwardly extending tapering recess 39, the wall 40 of the recess 39 flaring outwardly in a downward direction to an annular valve 41 provided on the bottom edge of valve knob 37. The annular valve 41 is arranged to cooperate with, press against and close off the valve seat 34 and press the flared flange 32 of the lid 31 against the center tube top edge 33 when the valve knob 37 has been pressed down.

The by-pass control knob 37 has a bottom external retaining ring groove 42 with a retaining ring 43 therein of dimensions sufficient to prevent the valve knob 37 from being pulled through and removed from the collar 36. A detent groove 44 in knob 37 cooperates with the spring 38 when the valve knob 37 has been pulled upward to maintain said valve knob 37 in a first or open position, said spring 38 fitting into said groove 44 at portions of the spring where said spring passes between vertical pieces 36c of collar 36. Spring 38 is under tension when cooperating with detent groove 44. Above and separated from the detent groove 44 by a ridge 45 is an upwardly and inwardly inclined ramp 46 cooperating with the spring 38 when the valve knob 37 has been pushed downward to maintain said valve knob 37 in a second or closed position and to apply pressure between the valve 41 and the valve seat 34. Spring 38 is accordingly under tension when cooperating with ramp 46. Ramp 46 is sufficiently long so that the spring 38 bears against said ramp and presses the valve 41 against valve seat 34 when cover 35 is in its proper position on the pot 10 and valve knob 37 is in its closed position. Cover 35 of pot 10 is held in place by a tight frictional fit with the pot, even when valve 41 is being pressed against valve seat 34 by spring 38.

The valve knob 37 with the exception of retaining ring 43 is of smaller maximum dimension than the internal diameter of rings 36a and 36b of collar 36, so that knob 37 has a degree of freedom to move in a generally horizontal plane in any direction as a result of being solely supported by the spring 38. The perforated basket 24 also is movable in a generally horizontal plane as previously mentioned. The "play" of these elements, the initial general alignment of basket 24 due to the interfitting of pump 14 within well 13a, and the downward force exerted on valve 41 by spring 38 all cooperate so that when valve 41 is pressed to its closed position against the flared annular valve seat 34, said valve and valve seat align and form a tight seal with one another. Because of this interaction, it is possible to manufacture the present invention utilizing relatively large dimensional tolerances for the individual components of the pot while still insuring a complete seal between valve 41 and valve seat 34 in every pot produced. The cost savings over a dimensionally precise construction of each component to insure said sealing are easily appreciated.

In operation the pot 10 may be set over any suitable heat source such as the burner of an electric or gas range. The coffee solids 23 are initially placed in the perforated basket 24, the perforated lid 31 is then placed on the basket 24, and the cover 35 is placed in position on the pot 10 holding a measured amount of water 47. The valve 41 is closed by pressing down on the valve knob 37, and the aforementioned seal is formed between valve 41 and the valve seat 34. Flange 32 of the perforated lid 31 is accordingly pressed against the top edge 33 of the center tube 27, thus insuring that no liquid can leak into the basket 24 holding the coffee 23.

The heat source is then turned on and left for an indefinite period until it is observed by sound or sight through the transparent valve knob 37 that pump 14 is passing water up stem 15 into the recess 39 in knob 37. As long as the valve 41 is in the closed position, the water percolating up through the stem 15 and discharge opening 51 at the top of the stem hits the recess walls 40 and is directed downwardly toward the center tube 27 of basket 24. This water is conducted downward through the by-pass passage between the inner wall of the center tube 27 and the outer wall of stem 15 back to the water 47 in the pot 10. Spacing dimples 28 and 29 and basket stop 30 do not substantially impair this flow of water down the by-pass passage. The percolating water cannot reach the coffee 23 in the basket 24 as long as the valve knob 37 (and therefore valve 41) is in the closed position. There is therefore no need to watch the pot or time its operation at this point, since liquid coffee is not being made.

When it is observed that the water is percolating, the heat source may be discontinued, either by removing the pot 10 from the heat source or, if a gas flame, by merely turning off the flame. At the same time the valve knob 37 is pulled up to its open position, and the heat retained in disc 18 will cause the water to continue to percolate for approximately six to eight minutes. This has been found to be the optimum period which coffee should be percolated to provide the most desirable coffee flavor, without any of the oils which start to come through when this period of time is exceeded by any substantial amount or when the coffee is percolated more rapidly for a shorter period. The valve 41 having been opened by pulling up valve knob 37, the water now percolating up through the stem 15 into the recess 39 in the valve knob 37 and hitting the wall 40 thereof follows along the wall 40, which extends outwardly over the valve seat 34. This water is thus led onto the perforated lid 31, through the perforations of the lid 31, and through the coffee solids 23 and the perforated basket bottom 25. None of the coffee liquid now forming will flow back down the by-pass passage, because of the configuration and positioning of recess 39.

When the automatically timed percolation of the coffee stops, the liquid coffee in the pot may then by served or it may be left in the pot a while longer if desired. Although there is insufficient residual heat in the disc 18 to cause percolation after the optimum period of time, there is still sufficient residual heat to keep the coffee warm for a much longer period than is possible with an ordinary coffee pot not having this heat retaining means.

A particular virtue of the present invention is that it prevents the so-called foaming or boiling over of liquid coffee common to conventional percolators. This foaming action is known to occur when the water in the pot begins to become liquid coffee and is boiled throughout the pot and not just under the pump 14. When the heat source has been removed from under disc 18 and liquid coffee is being made in the present invention, however, substantial heat is delivered to the pot 10 from disc 18 only directly underneath pump 14 through stud 17. No substantial boiling of the liquid in the pot will therefore occur except under the pump 14 and no foaming over of the liquid coffee will occur while the liquid coffee is being percolated. The advantages of eliminating foaming over of the coffee have been previously mentioned.

While a preferred embodiment of the present invention has been shown and described, it will be understood that the invention may be variously embodied without departing from the spirit and scope thereof.

I claim:

1. A self-timing beverage percolator, comprising in combination: a container for liquid having a removable cover; a perforated basket for containing solids to be brewed; a perforated removable lid for the basket; pump means supported at the bottom wall of the container; a hollow stem supported by said pump means and having means for supporting said basket in elevated position thereon; means defining a by-pass passage; by-pass control means operable between an open and a closed position; said control means when closed leading percolating liquid coming up said stem through the by-pass passage and back to the bottom of the container without passing through said basket; said control means when open leading percolating liquid coming up said stem through the basket before passing back to the bottom of the container; a cast iron heat retaining element attached to the bottom wall of the container; said heat retaining element having a substantial heat conductive path to the bottom of the container over a limited area beneath said pump means and being conductively insulated from the bottom of the container at substantially all areas outside said path; said heat conductive path to the bottom of the container consisting of an aluminum member making a watertight thermal connection to said container bottom at one of its ends, being force-fitted into an opening in said heat retaining element to make a watertight thermal connection therewith at its other end, and being of sufficient length to space said element from said container bottom wall.

2. A self-timing beverage percolator, comprising in combination: a container for liquid having a removable cover; a perforated basket for containing solids to be brewed; a perforated removable lid for the basket; pump means supported at the bottom wall of the container; a hollow stem supported by said pump means and having means for supporting said basket in elevated position thereon; means defining a by-pass passage; by-pass control means operable between an open and a closed position, said by-pass control means being a member disposed in said container cover; spring means under tension suspending and cooperating with said by-pass member to determine its open and closed positions; said control means when closed leading percolating liquid coming up said stem through the by-pass passage and back to the bottom of the container without passing through said basket; said control means when open leading percolating liquid coming up said stem through the basket before passing back to the bottom of the container; a heat element attached to the bottom wall of the container; said heat retaining element having a substantial heat conductive path to the bottom of the container over a limited area beneath said pump means and being conductively insulated from the bottom of the container at substantially all areas outside said path.

3. A self-timing beverage percolator, comprising in combination: a container for liquids having a removable cover; a perforated basket for containing solids to be brewed; a perforated removable lid for the basket, said lid having an upwardly flared central annular valve seat thereon and a central annular downwardly flared flange adjacent said valve seat; pump means supported at the bottom wall of the container; a hollow stem supported by said pump means and having means for supporting said basket in elevated position thereon; said basket having a hollow imperforate center shaft of greater internal diameter than the external diameter of the stem, said shaft fitting over said stem; said shaft having an upwardly flared top edge which fits under said downwardly flared flange of the lid when the lid is placed on the basket; a plurality of spacing dimples extending from said shaft to generally align said basket on said stem and provide a by-pass passage between said shaft and said stem; by-pass control means operable between an open and a closed position, said control means comprising a knob centrally disposed in said cover; said knob having an upwardly extending tapering recess therein, the wall of said recess flowing outwardly in a downward direction to an annular valve at the bottom edge of the knob and said annular valve extending outwardly over said valve seat when said knob is operated to its open position; said valve cooperating with said valve seat to form a seal when said knob is operated to its closed position; said control means when closed leading percolating liquid coming up said stem through the by-pass passage and back to the bottom of the container without passing through said basket; said control means when open leading percolating liquid coming up said stem through the basket before passing back to the bottom of the container; a heat retaining element attached to the bottom wall of the container; said heat retaining element having a substantial heat conductive path to the bottom of the container over a limited area beneath said pump means and being conductively insulated from the bottom of the container at substantially all areas outside said path.

4. A self-timing beverage percolator, comprising in combination: a container for liquids having a removable cover; a perforated basket for containing solids to be brewed; a perforated removable lid for the basket, said lid having a central annular valve seat thereon; pump means supported at the bottom wall of the container; a hollow stem supported by said pump means and having means for supporting said basket in elevated position thereon; said basket having a hollow imperforate center shaft of greater internal diameter than the external diameter of the stem, said shaft fitting over said stem; a plurality of spacing dimples extending from said shaft to generally align said basket on said stem and provide a by-pass passage between said shaft and said stem; by-pass control means operable between an open and a closed position, said control means comprising a knob centrally disposed in said cover; said knob being disposed within a collar extending centrally downward within said cover; said collar having spring means under tension suspending and cooperating with said knob to determine its open and closed positions; said knob having a detent groove cooperating with said spring means to determine the open position of said knob; said knob having an inclined ramp cooperating with said spring means to determine the closed position of said knob; said spring means pressing against said ramp to force said valve against said valve seat and form a seal when said knob is operated to its closed position; said knob having an upwardly extending tapering recess therein, the wall of said recess flowing outwardly in a downward direction to an annular valve at the bottom edge of the knob and said annular valve extending outwardly over said valve seat when said knob is operated to its open position; said control means when closed leading percolating liquid coming up said stem through the by-pass passage and back to the bottom of the container without passing through said basket; said control means when open leading percolating liquid coming up said stem through the basket before passing back to the bottom of the container; a heat retaining element attached to the bottom wall of the container; said heat retaining element having a substantial heat conductive path to the bottom of the container.

5. A self-timing beverage percolator, comprising in combination: a container for liquids having a removable cover; a perforated basket for containing solids to be brewed; a perforated removable lid for the basket, said lid having a central annular valve seat thereon; pump means supported at the bottom wall of the container; a hollow stem supported by said pump means and having means for supporting said basket in elevated position thereon; said basket having a hollow imperforate center shaft of greater internal diameter than the external diameter of the stem, said shaft fitting over said stem; a plurality of spacing dimples extending from said shaft to generally align said basket on said stem and provide a by-pass passage between said shaft and said stem; said dimples being slightly spaced from said stem to allow said basket and correspondingly said valve seat a degree of freedom to move in a generally horizontal direction; by-pass control means operable between an open and a closed position, said control means comprising a knob centrally disposed in said cover; said knob having an upwardly extending tapering recess therein, the wall of said recess flowing outwardly in a downward direction to an annular valve at the bottom edge of the knob and said annular valve extending outwardly over said valve seat when said knob is operated to its open position; spring means permitting said knob and correspondingly said valve a degree of freedom to move in a generally horizontal direction, said spring means also forcing said valve against said valve seat when the knob is operated to its closed position whereby said valve and valve seat readily align to form a seal; said control means when closed leading percolating liquid coming up said stem through the by-pass passage and back to the bottom of the container without passing through said basket; said control means when open leading percolating liquid coming up said stem through the basket before passing back to the bottom of the container; a heat retaining element attached to the bottom wall of the container; said heat retaining element having a substantial heat conductive path to the bottom of the container.

6. A self-timing beverage percolator, comprising in combination: a container for liquid having a removable cover; a perforated basket for containing solids to be brewed: a perforated removable lid for the basket; pump means supported at the bottom wall of the container; a hollow stem supported by said pump means and having means for supporting said basket in elevated position thereon; means defining a by-pass passage; by-pass control means operable between an open and a closed position; said control means when closed leading percolating liquid coming up said stem through the by-pass passage and back to the bottom of the container without passing through said basket; said control means when open leading percolating liquid coming up said stem through the basket before passing back to the bottom of the container; a cast iron heat retaining element attached to the bottom wall of the container; said heat retaining element having a substantial heat conductive path to the bottom of the container over a limited area beneath said pump means and being conductively insulated from the bottom of the container at substantially all areas outside said path; said heat conductive path to the bottom of the container consisting of a stainless steel member making a watertight thermal connection to said container bottom at one of its ends, being force-fitted into an opening in said heat retaining element to make a watertight thermal connection therewith at its other end, and being of sufficient length to space said element from said container bottom wall.

References Cited
UNITED STATES PATENTS

| | | | |
|---|---|---|---|
| 906,629 | 12/1908 | Holley | 99—312 |
| 956,481 | 4/1910 | Chapman | 99—310 |
| 1,047,402 | 12/1912 | Gefter | 99—310 |
| 1,309,374 | 7/1919 | Swan | 99—311 |
| 1,581,871 | 4/1926 | Roberts | 99—312 X |
| 1,582,685 | 4/1926 | Pence | 99—305 X |
| 3,068,777 | 12/1962 | Pedalino | 99—305 |

WILLIAM I. PRICE, *Primary Examiner.*

U.S. Cl. X.R.

99—312

PO-1050
(5/69)

UNITED STATES PATENT OFFICE
CERTIFICATE OF CORRECTION

Patent No. 3,429,255      Dated February 25, 1969

Inventor(s) Alfonza Pedalino

It is certified that error appears in the above-identified patent and that said Letters Patent are hereby corrected as shown below:

In the claims (cl. 2), Col. 7, line 43, after "heat" insert -- retaining -- .

SIGNED AND SEALED

OCT 21 1969

(SEAL)
Attest:

Edward M. Fletcher, Jr.
Attesting Officer

WILLIAM E. SCHUYLER, JR
Commissioner of Patents